T. F. MULLIGAN.
AUTOMATIC AIR RELIEF FOR LIQUID MEASURING METERS.
APPLICATION FILED DEC. 20, 1909.
1,119,979.
Patented Dec. 8, 1914.
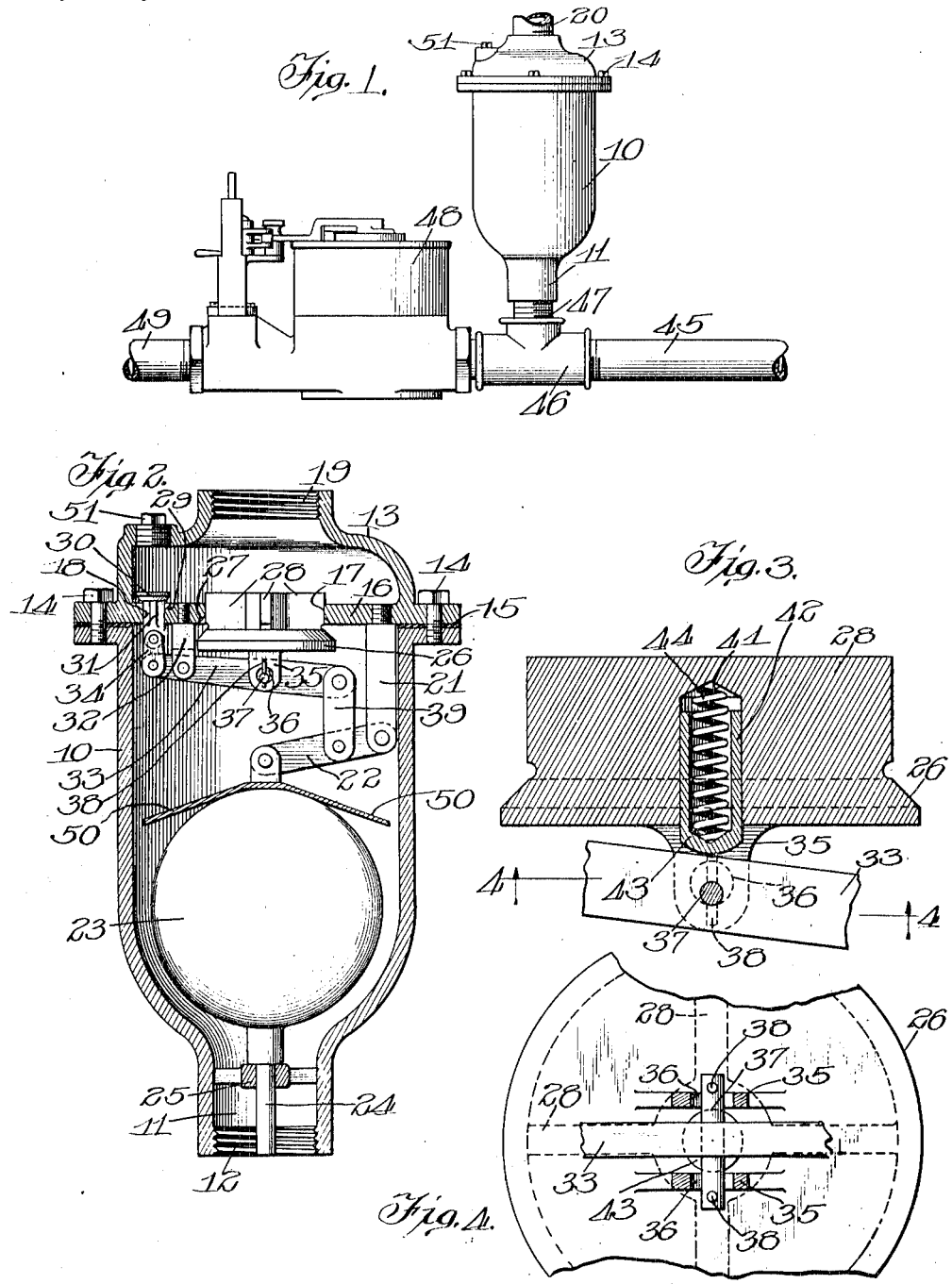

UNITED STATES PATENT OFFICE.

THOMAS F. MULLIGAN, OF FORT WAYNE, INDIANA, ASSIGNOR TO S. F. BOWSER & CO., INCORPORATED, OF FORT WAYNE, INDIANA.

AUTOMATIC AIR-RELIEF FOR LIQUID-MEASURING METERS.

1,119,979. Specification of Letters Patent. Patented Dec. 8, 1914.

Application filed December 20, 1909. Serial No. 534,010.

*To all whom it may concern:*

Be it known that I, THOMAS F. MULLIGAN, a citizen of the United States, residing at Fort Wayne, in the county of Allen and State of Indiana, have invented certain new and useful Improvements in Automatic Air-Relief for Liquid-Measuring Meters, of which the following is a specification.

Heretofore in the employment of liquid meters when the source of supply is located some distance from the meter, considerable difficulty has been experienced in that air will be forced through the meter causing it to register. This particularly occurs when heavy or viscous oils are used which carry with them globules of air, the air accumulating between the source of supply and the meter so as to be forced through the meter, with the result that the meter will incorrectly register the amount of liquid passing therethrough and a short supply of liquid will be furnished to the consumer.

To overcome these difficulties and objections and to provide improved means whereby the air will automatically escape or be discharged from the system before the liquid passes through the meter, is the primary object of the present invention.

A further object is to provide an improved trap or escape for the air which will automatically operate to open to permit the air to escape and to close after the discharge of air to prevent the escape of liquid.

A further object is to provide an improved simple and efficient device of this character which may be readily installed.

To the attainment of these ends and the accomplishment of other new and useful objects, as will appear, the invention consists in the features of novelty in the construction, combination and arrangement of the several parts hereinafter more fully described and claimed and shown in the accompanying drawing illustrating the embodiment of the invention, and in which—

Figure 1 is a view of a meter showing an improved device of this character attached thereto. Fig. 2 is an enlarged sectional view of the air relief or trap. Fig. 3 is an enlarged detail sectional view of one of the valves showing the manner of connecting the valve to its operating arm or lever. Fig. 4 is an enlarged detail sectional view on line 4—4 of Fig. 3 looking in the direction of the arrows.

Referring more particularly to the drawing and in the present exemplification of the invention the numeral 10 designates a chamber which may be of any desired size and configuration and is provided with an inlet opening 11 at the base thereof, which opening is preferably provided with internal screw threads 12 for the purpose of attaching the chamber to the supply pipe. The chamber 10 is provided with a cap 13 which is preferably removably secured to the chamber in any desired or suitable manner, such as by means of fastening bolts 14 passing through coöperating flanges on the wall of the chamber and the cap. If desired, suitable packing material 15 may be provided between the flanges to form a fluid tight joint. The chamber 10 is provided with a partition 16 extending thereacross and spaced from the top of the cap 13. This partition 16 may be formed in any suitable manner but is preferably formed integral with the cap 13 and is provided with openings 17 and 18 therethrough, forming communication with the portion of the chamber below the partition and the portion above the partition below the top of the cap 13. The cap is provided with an opening 19 which forms an outlet for the chamber and this opening 19 is preferably provided with interior screw threads into which one extremity of a pipe 20 is adapted to be inserted, and which pipe forms a discharge pipe for the air from the system and may be of any desired length to conduct the air passing out of the chamber at any desired point.

A support 21 is preferably removably secured to the partition 16 so as to depend from the partition and extend for any desired distance into the chamber 10. Pivotally connected to the support 21 and by one extremity thereof is a link 22 and pivotally connected to the free extremity of the link 22 is a ball or float 23 which latter is adapted to rise and fall in the chamber 10 and this rising and falling movement will be permitted by means of the link 22. Depending from the float 23 is a projection 24 which is adapted to pass through a suitable guide 25 preferably arranged adjacent the bottom of the chamber 10 and the outlet 11. This projection 24 coöperating with the guide 25 holds the float against accidental displacement.

The opening 17 through the partition 16 is preferably of a large diameter and a valve 26 is provided which coöperates with a portion 27 of the opening 17 and which portion 27 forms the valve seat to close the opening 17. The valve 26 is preferably provided with wings 28 extending from the upper face thereof and these wings engage the wall of the opening 17 to serve as guides for the valve. The valve is preferably arranged within the chamber 10 below the partition 16 so as to close upwardly against its seat 27 when the float 23 rises and to open when the float descends, in a manner to be set forth. The opening 18 in the partition 16 is preferably of a diameter somewhat smaller than the diameter of the opening 17 and this opening 18 is provided with a portion 29 forming a valve seat on the side of the partition opposite to the side on which the valve seat 27 is located. A valve 30 is provided which is arranged on the side of the partition opposite to the side on which the valve 26 is located and is provided with a stem 31 projecting through the opening 18 to guide the valve 30 toward and away from its seat 29. These valves 26, 30 are arranged to work in opposition to each other and any suitable means may be provided for accomplishing this result. For this purpose there may be provided a support 32 which is preferably removably secured to the partition 16 and depends into the chamber 10 and is located preferably between the apertures or openings 17, 18. An arm or lever 33 is pivotally connected intermediate its ends to the support 32 and one of the extremities thereof is pivotally connected preferably by means of a link 34 to the stem 31 of the valve 30. The valve 26 is provided with spaced parallel ears 35 depending therefrom and these ears are provided with registering apertures or openings 36 passing transversely therethrough. A portion of the arm or lever 33 stands between the spaced ears 35 and is connected to the valve 26 by means of a transverse pin or connecting member 37 which extends through the registering apertures 36 in the ears 35 and is secured to the arm or lever 33. This connecting bar or member 37 is of a diameter somewhat smaller than the diameter of the apertures or openings 36 so that the member may be adapted for free bodily movement in the apertures 36. The extremities of this member 37 preferably project beyond the respective ears or projections 35 and the member and lever are held from displacement with respect to the ears in any desired or suitable manner, preferably by means of fastening devices or pins 38 passing through the member 37 beyond the ears. The other end of the arm or lever 33 is connected to the link 22 intermediate the points of connection of the latter with the support 21 and the float 23 in any desired or suitable manner, preferably by means of a link 39 which is pivoted by its ends respectively to the link 22 and the free end of the arm or lever 33.

The valve 26 is provided with a downwardly opening recess 41 which preferably extends into the wings 28 and opens through the bottom of the valve between the ears or projections 35. A tubular member 42 having a closed end 43 is arranged in the recess 41 and is of a diameter to substantially fill the recess and to move freely therein. The closed end 43 of the tubular member 42 projects beyond the lower face of the valve 26 and engages and rests upon the adjacent portion of the arm or lever 33. An elastic member 44, such as a coil spring or the like, is provided within the tubular member 42 and the recess 41 and one extremity of this elastic member rests against the bottom of the recess 41 and the other extremity against the bottom 43 of the tubular member 42. The tension of this elastic member serves to hold the bottom of the tubular member 43 in yielding engagement with the edge of the arm or lever 33 to force the pin or member 37 against the bottom of the apertures 36 thereby forming an elastic or yielding connection between the lever 33 and the valve 26, to close the valve 26 in advance of the valve 30, and also serves to unseat the valve 30 when pressure is released on the float 23.

The chamber 10 is connected to the supply pipe 45 in any desired or suitable manner, preferably by means of a T-coupling 46 and a connection 47 and is preferably located as closely as possible to the meter designated generally by the reference numeral 48. The meter may be of any construction and forms no part of the present invention; suffice it to say that the liquid will be supplied to the pipe 45 in any desired or suitable manner and will flow through the pipe, the T-connection 46, the meter 48, which latter registers the quantity as the liquid passes therethrough and out through the discharge pipe 49.

In operation, the liquid when flowing through the pipe 45 to the meter 48 will be under pressure and as the liquid flows into the chamber 10 the float 23 will be raised, during which movement the valves 26 and 30 will be seated against their respective seats to prevent the escape of the liquid through the discharge pipe 20. The liquid will also flow through the meter 48. When the discharge of the liquid is shut off, the pressure on the liquid to force it through the pipe will be relieved, and any air which enters the pipe with the liquid will gradually work its way toward the coupling 46 and will seek the highest point in the system, which will cause it to enter the chamber 10 and arise to the partition 16. As the pressure in the system is relieved, the liquid will settle or seek its own level and will permit the float 23 to drop a short distance. During this movement of the float, the arm or lever 33 will raise the valve 30 off its seat to permit the air accumulated in the chamber 10 to escape through the opening 18 and out of the discharge pipe 20. As the float descends further, the arm or lever 33 will unseat the valve 26 to open the other passage for the air from the chamber 10 to the discharge pipe 20. In the event that a vacuum or partial vacuum is formed in the chamber 10 below the partition 16 which vacuum would tend to hold the valve 30 seated, the weight of the float and the connecting mechanism during its falling movement will overcome the vacuum and unseat the valves.

When the liquid is first supplied to the pipe 45, the float 23 will be in the position shown in Fig. 2 and the valves 26, 30 will be open. In this position any volume of air which enters the system in advance of the liquid will flow into the chamber 10 and out thereof through the openings 17 and 18, the opening 17 being provided for this especial purpose. As the liquid rises in the chamber 10 the float will be raised and the valve 26 will first be seated and then the valve 30.

In order to prevent the valve 26 from being jarred or jammed by a sudden inrush of the liquid into the chamber 10, the yielding or elastic connection is provided between the valve 26 and the arm or lever 33.

In order to obviate the danger and to prevent the liquid from splashing out of the openings 17 and 18, which would occur under a sudden inrush of the liquid into the chamber 10 when the valves 26 and 30 are unseated, a shield 50 is provided which is secured to the float 23 to move therewith and extends across and substantially fills the chamber 10. The liquid rushing into the chamber 10 and around the float 23 will contact with this shield 50 and will be prevented from splashing out of the openings.

If desired, the cap or top of the chamber 10 may be provided with an opening which is closed by a suitable closure 51 and through which opening access may be had to the interior of the chamber.

With this improved construction it will be apparent that all of the operating mechanism within the chamber 10 is supported entirely by the partition 16 so that when the cap 13 is removed, the entire mechanism will be removed at the same time.

It will also be apparent that with this improved construction the valves will be automatically unseated to permit the air to be discharged and will also be automatically seated to prevent the escape of any of the liquid when the air is discharged.

What is claimed as new is—

1. The combination with a receptacle having a chamber adapted to receive air and liquid and provided with an air outlet, a float supported by the liquid in the chamber, a valve operatively connected with the float to automatically control the air outlet, a shield mounted on and directly above the float to prevent the liquid from swirling past the float through the outlet.

2. The combination with a receptacle having a chamber adapted to receive air and liquid with an inlet at the bottom and an outlet at the top, of a spherical float vertically movable and having a cross section less than the cross section of the chamber, a valve at the top of the receptacle above the float and operatively connected therewith, and a shield connected to the float directly above it of a size less than the cross section of the chamber, movable with the float in the chamber and in the direct path between the inlet and outlet, to prevent the liquid from swirling about and above the float through the outlet.

3. An air relief for liquid systems, comprising a receptacle with a chamber adapted to receive air and liquid and provided with an outlet comprising a plurality of air passages, oppositely disposed valves of graduated sizes for controlling the passages, a float within the chamber, a connection between one of the valves and the float, and a yielding connection between the float and one of the other valves whereby the latter valve is resiliently seated in advance of the other valve.

4. An air relief for liquid systems comprising a receptacle with a chamber adapted to receive air and liquid with an air outlet comprising a plurality of graduated air passages, oppositely disposed unbalanced valves for controlling the passages, an operating lever for the valves, a connection between the lever and one of the valves, a yielding connection between the lever and the other valve, a float and connection between the float and the lever whereby the valves are operated one in advance of the other.

5. A device of the class described, comprising a receptacle with a chamber adapted to receive air and liquid, a removable cap for the chamber with a perforated partition with graduated openings and air outlet at the top of the cap, unbalanced valves controlling the openings, and means within the chamber below the partition controlled by the height of the liquid in the chamber, for automatically operating the valves in succession, all of said parts being supported by the partition of said cap and removable from the chamber therewith.

6. An apparatus of the class described comprising a chamber adapted to receive air and liquid, a removable cap for the chamber, a partition supported by the cap and extending across the chamber, said cap being provided with an air outlet and said partition being provided with spaced air openings, oppositely opening valves controlling the openings, and means within the chamber below the partition and controlled by the height of the liquid in the chamber for operating the valves, all of said parts being supported by the said partition and removable from the chamber therewith.

7. An apparatus of the class described comprising a chamber adapted to receive air and liquid, a removable cap for the chamber, a partition supported by the cap and extending across the chamber, said cap being provided with an air outlet and said partition being provided with spaced air openings, valves controlling the openings, a float within the chamber below the partition and operative connections between the float and the valves, for operating the valves, said float, valves and connections being supported by and removable from the chamber with the said partition.

8. In a device of the character described, the combination of a chamber having an outlet and an inlet, a valve for controlling the outlet, an operating lever, a loose connection between the lever and valve, said valve being provided with a recess, a tubular member telescoping with the recess and terminating short of the bottom thereof, said tubular member having a closed end engaging the lever adjacent the connection, and an elastic member disposed between the bottom of the closed end of said tubular member and the bottom of the recess.

9. In a float controlled valve, a combination with a receptacle with a chamber having an outlet and an inlet, of a valve for controlling the outlet, an operating lever, an elastic connection between the lever and valve, a loose connection embodying a perforated lug in connection with the valve, and a pin in connection with the lever fitting the perforation loosely, and a float connected with the lever.

10. In a device of the class described, the combination with a receptacle having a chamber with an inlet and an outlet comprising graduated outlet apertures, unbalanced valves of different sizes opening oppositely to control the apertures, a lever to which the valves are connected on opposite sides of its fulcrum, an elastic connection between the larger valve and the lever, and a float connected to the lever for operating it in accordance with the amount of liquid in the chamber, the lever being adapted to resiliently close the larger aperture first and then the smaller, gradually diminishing the outlet opening, and being adapted when the valves are opened to uncover the smaller aperture first and then the larger to gradually increase the outlet.

In testimony whereof I have signed my name to this specification, in the presence of two subscribing witnesses, on this 16th day of December A. D. 1909.

THOMAS F. MULLIGAN.

Witnesses:
SYLVANUS B. BECHTEL,
B. M. BRINK.